United States Patent [19]

Eisenhauer

[11] Patent Number: 4,572,035
[45] Date of Patent: Feb. 25, 1986

[54] TOOL CONSTRUCTIONS FOR REMOVING FROZEN NUTS

[76] Inventor: Elroy C. Eisenhauer, 775 Tifft St., Buffalo, N.Y. 14220

[21] Appl. No.: 634,867

[22] Filed: Jul. 26, 1984

[51] Int. Cl.⁴ .............................................. B25B 23/08
[52] U.S. Cl. .................... 81/53.2; 29/426.5; 30/277
[58] Field of Search ................. 30/277, 272, 305, 315, 30/168; 29/275, 426.4, 426.5; 81/121.1, 463, 465, 466, 53.2

[56] References Cited

U.S. PATENT DOCUMENTS

| | | | |
|---|---|---|---|
| 2,558,641 | 6/1951 | Beezley | 30/272 |
| 2,853,723 | 9/1958 | Winslow | 29/275 X |
| 3,087,364 | 4/1963 | Witmer | 29/426.5 X |
| 3,161,090 | 12/1964 | McLellan | 81/53.2 |
| 3,231,972 | 2/1966 | Annese et al. | 30/168 |
| 4,083,111 | 4/1978 | Kerins | 30/168 |
| 4,188,722 | 2/1980 | Young | 30/168 |

Primary Examiner—Jimmy C. Peters
Attorney, Agent, or Firm—Joseph P. Gastel

[57] ABSTRACT

A combined nut cutter and wrench tool including a body having an axis and a base from which a plurality of cutting blades extend with the cutting blades each having a first surface inclined relative to the axis and a second surface extending generally in the direction of the axis, the first and second surfaces converging to form cutting edges. A nut cutting tool including a body in the shape of a nut having an axis and an outer peripheral surface for reception in a socket of a socket wrench, a base on the body and a plurality of cutting blades extending outwardly from the base around the axis.

9 Claims, 9 Drawing Figures

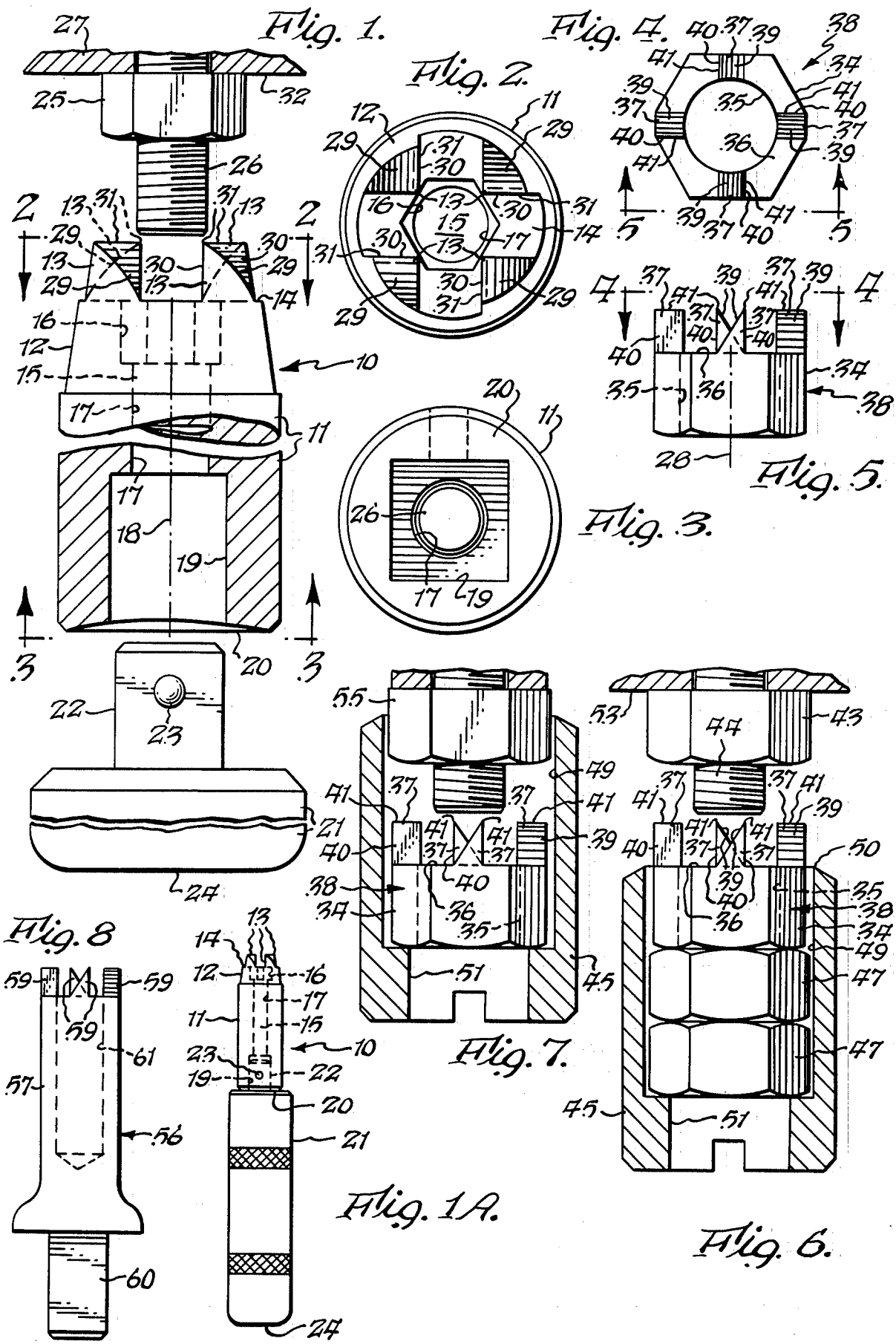

TOOL CONSTRUCTIONS FOR REMOVING FROZEN NUTS

BACKGROUND OF THE INVENTION

The present invention relates to improved tool constructions which can be used for cutting a frozen nut from its associated bolt and optionally for unscrewing the nut if it has been sufficiently loosened during the cutting action.

By way of background, frozen nut cutters are known. Tools of these types are shown in U.S. Pat. Nos. 3,231,972, 4,083,111 and 4,188,722. However, tools of this type cannot be used for unscrewing a nut in the event it has been loosened during the process of cutting. In addition, the prior tools were all mounted on an elongated body which occupied considerable space and which could not be used in conjunction with a socket wrench to remove a frozen nut which had been loosened by a cutting action.

SUMMARY OF THE INVENTION

It is one object of the present invention to provide a combined cutter and wrench for removing frozen nuts, the wrench being used in the event the cutter loosens the nut sufficiently to permit it to be turned.

Another object of the present invention is to provide an improved tool for cutting a nut, said tool being mounted on a body which can be used in conjunction with a socket of a socket wrench to provide both improved cutting and turning action for the nut which is being cut. Other objects and attendant advantages of the present invention will readily be perceived hereafter.

The present invention relates to a combined nut cutter and wrench tool comprising a body having an axis, a plurality of cutting blades on said body, each of said blades having a first side which is inclined relative to said axis and a second side which extends in substantially the same direction as said axis, said first and second sides converging to form cutting edges, and an opening between said blades for receiving a bolt.

The present invention also relates to a tool for cutting a nut comprising a body in the shape of a nut having an axis and an outer peripheral surface for turning engagement by a wrench, and a plurality of cutting blades on said body extending in the general direction of said axis.

The various aspects of the present invention will be more fully understood when the following portions of the specification are read in conjunction with the accompanying drawings wherein:

BRIEF DESCRIPTION OF THE DRAWINGS

FIG. 1 is a fragmentary exploded view, partially in cross section and partially in side elevation, of the improved combined nut cutter and wrench tool shown in relationship to a nut which is to be cut and a handle for the tool;

FIG. 1A is a diminutive view of the assembly of FIG. 1 which is not fragmentary;

FIG. 2 is a view of the blades of the tool taken substantially in the direction of arrows 2—2 of FIG. 1;

FIG. 3 is a view of the handle-receiving end of the tool taken substantially in the direction of arrows 3—3 of FIG. 1;

FIG. 4 is a view similar to FIG. 2 and showing another embodiment of the tool which includes a nut-like member as the body for mounting nut-cutting blades, FIG. 4 being taken in the direction of arrows 4—4 of FIG. 5;

FIG. 5 is a side elevational view of the tool of FIG. 4 taken substantially in the direction of arrows 5—5 of FIG. 4;

FIG. 6 is a view, partially in cross section and partially in side elevation, showing the manner in which the tool of FIGS. 4 and 5 can be mounted in the socket of a socket wrench with the blades projecting beyond the end of the socket;

FIG. 7 is a view similar to FIG. 6 but showing the tool of FIGS. 4 and 5 mounted in the socket of a socket wrench with the blades within the socket so that the socket can guide the tool in relationship to a nut which is to be cut; and FIG. 8 is a side elevational view of another embodiment of the present invention for use with a pneumatic chisel mounting device.

DESCRIPTION OF THE PREFERRED EMBODIMENTS

The combined nut cutter and wrench tool 10 of the present invention includes a body 11 which may be of substantially cylindrical outer configuration having an axis 18 and a frustoconical end portion 12 on which are located a plurality of blades 13 which project outwardly from base 14 at the outer end of frustoconical portion 12. Blades 13 are evenly spaced about axis 18 and axial opening 15 which is in line with axial bore 16 of frustoconical member 12 and axial bore 17 of body 11. A square impact handle receiving socket 19 is coaxial with bores 16 and 17 and extends inwardly from end 20 of body 11. Impact handle 21 is an elongated member having a boss 22 of square cross sectional configuration for mating engagement with bore 19. A spring-biased ball detent 23 is mounted on boss 22 for retaining holder 21 in engagement with body 11. The end 24 of holder 21 is intended to be a blow-receiving surface which is struck by a hammer or the like to drive blades 13 into nut 25 which may be rusted onto or otherwise frozen to bolt 26 which is associated with a member 27.

In accordance with the present invention, blades 13 have first surfaces 29 which are inclined to base 14 and second surfaces 30 which extend substantially perpendicularly to base 14. Surfaces 29 are also inclined relative to axis 18 and surfaces 30 extend generally in the direction of axis 28. Surfaces 29 and 30 converge and terminate at cutting edges 31. The cutting blades may be fabricated of any suitable type of hard tool material and may be formed integrally with frustoconical portion 12 or otherwise permanently secured thereto.

The embodiment of FIGS. 1–3 is used in the following manner: The body 11 is mounted on impact handle 21 and the tool 11 is placed in position with bolt 26 within opening 15 and possibly extending into bore 16. Thereafter, hammer blows are applied to surface 24 of holder 21. This will force the cutting edges 31 into frozen or rusted nut 25. The hammering can continue until blades 13 penetrate nut 25 for a substantial distance. Thereafter, boss 22 of tool 21 can be removed from opening 19 and a similar boss of the type positioned at the end of a wrench handle can be inserted into opening 19. An attempt can then be made to turn nut 25 in the direction in which sides 30 of blades 13 bear against the adjacent edges of the nut into which they have been driven to thereby unscrew nut 25 from bolt 26. The cutting blades 13 will not cam out of nut 25 because blade surfaces 30 are not inclined to the axis of the nut 25. This can be more readily appreciated when it is considered that if the tool 11 was turned in the wrong direction, inclined surfaces 29 would cam out of nut 25. The foregoing action of unscrewing nut 25 may be possible in many instances because the jarring of nut 25 when blades 13 are pounded into it may loosen the nut from its frozen condition. The unscrewing of nut 25 is especially desirable when it is important to avoid marring of surface 32 against which nut 25 bears.

Another tool embodiment 38 of the present invention is shown in FIGS. 4–7. In this embodiment the body 34 of the tool comprises a hexagonal nut-like member having an axis 28 and a bore 35. Blades 37 extend outwardly from base 36. Each of blades 37 include a surface 39 which is inclined to base 36 and a surface 40 which extends substantially perpendicularly to base 36. Surfaces 39 also are inclined relative to axis 28 and surfaces 40 extend generally in the direction of axis 28. Converging surfaces 39 and 40 intersect to form cutting edges 41.

Cutting tool 38 can be used as shown in FIGS. 6 and 7. When it is desired to remove nut 43, which is frozen onto bolt 44, tool 38 may be mounted into the end of a socket wrench 45, as shown in FIG. 6. In this respect, hexagonal nuts 47, which are of substantially the same outer peripheral configuration as body 34, are inserted into hexagonal socket 49 of wrench 45. Thereafter, body 34 is inserted into hexagonal socket 49 with blades 37 projecting outwardly beyond the end 50 of socket wrench 45. An impact handle, such as 21 (FIGS. 1 and 1A), may be used with socket 45 by inserting boss 22 into opening 51. The surface 24 of handle 21 is hammered to drive blades 37 into nut 43. Thereafter, handle 21 can be removed and the conventional handle of a wrench having a boss which can be received in opening 51 is used to unscrew nut 43 if it has been loosened sufficiently. If not, the handle of the wrench is removed, and holder 21 is reassembled with socket 45 to continue the cutting of nut 43. As noted above, the unscrewing is desirable, if it can be done, when it is preferable not to deface surface 53 against which nut 43 bears. It is to be especially noted that if nut 43 is unfrozen as a result of the hammering, it can be unscrewed without removing tool 38 because the bearing of surfaces 40 against the adjacent portions of the nut will not result in the camming-out of the tool.

Another way in which the tool 38 can be used is depicted in FIG. 7 wherein tool 38 is inserted into hexagonal opening 49 of socket member 45 so that blades 37 are completely contained within opening 49. This permits socket 45 to be installed over nut 55 whereupon socket 45 will act as a guide to maintain cutting tool 38 in precise alignment with nut 55. It will be appreciated that tool 38 may be mounted as shown in FIG. 7 without any additional nuts 47, or if desired, only one nut 47 may be used instead of the two shown in FIG. 6. In any event, the axial position of tool 38 may be adjusted within opening 49 to meet any particular situation. In FIG. 7, the hexagonal opening 49 also mates with nut 55 so that if a wrench handle is inserted into opening 51 and a force applied thereto, a twisting force will be applied to the nut at blades 37 and also at the outer periphery of the nut.

A further modified tool 56 is shown in FIG. 8 wherein an elongated body 57 mounts blades 59 of the type described above relative to the other embodiments. A shank 60 is formed integrally with body 57 for reception in a pneumatic type of tool which provides a chattering type of action for driving blades 59 onto an associated nut. A bore 61 is located within body 57 for receiving a bolt as blades 59 are driven onto a nut associated therewith.

While the blades 37 of the tool 38 of FIGS. 4–7 have been shown as having surfaces 39 which are inclined to base 36 and surfaces 40 which are substantially perpendicular to base 36 for the above-discussed reasons, it will be appreciated that each of the blades, such as 37, may have two inclined surfaces to provide a chisel-like action without the capability of being used to unscrew the nut if it has been loosened. Part of the novelty of the tool 38 resides in the placement of the cutting blades on a nut-like body, such as 34, which can be used in the manner described above relative to FIGS. 6 and 7, without necessarily also aving the unscrewing feature described above.

The tools 11 and 38 are intended to be made in sets of graduated sizes, in the same manner as open-end wrenches, socket wrenches, hexagonal wrenches, etc. Furthermore, the tools can be made in sets for use with right and left-handed nuts. In this respect, it is to be noted that tool 11 is for use with nuts having right-handed threaded and tool 38 is for use with nuts having left-handed threads. The differences between the blades 13 (FIGS. 1–3) and blades 37 (FIGS. 4–7) is that the surfaces which are inclined and perpendicular to the base of the tool are reversed.

While four blades have been shown on each of the embodiments, it will be appreciated that any suitable number of blades can be used.

While preferred embodiments of the present invention have been disclosed, it will be appreciated that the present invention is not limited thereto, but may be otherwise embodied within the scope of the following claims.

What is claimed is:

1. A combined nut cutter and wrench tool comprising a body having an axis, a face on said body, a plurality of cutting blades on said body extending outwardly from said face in a generally axial direction, each of said blades having a first side which is inclined relative to said axis and a second side which extends in substantially the same direction as said axis, said first and second sides converging to form cutting edges extending in a generally radial direction relative to said axis and said second sides being oriented to bear against a nut after said blades have been driven into said nut without camming out of said nut when said tool is turned circumferentially against said nut, and an opening between said blades for receiving a bolt.

2. A combined nut cutter and wrench tool as set forth in claim 1 including means on the opposite side of said body from said plurality of cutting blades for mounting on an impact handle.

3. A combined nut cutter and wrench tool as set forth in claim 1 wherein said body is a nut-like member for insertion into a socket.

4. A combined nut cutter and wrench tool as set forth in claim 1 wherein said plurality of blades are evenly spaced about said opening.

5. A tool for cutting a nut comprising a body in the shape of a nut having an axis and an outer peripheral surface for turning engagement by a wrench and a face extending substantially perpendicularly to said outer peripheral surface, and a plurality of cutting blades on said face extending generally radially on said body and in the general direction of said axis, each of said blades having a first side inclined relative to said axis and a second side extending generally in the direction of said axis, said first and second sides converging to form cutting edges.

6. A tool for cutting a nut as set forth in claim 5 wherein each of said blades have a first side inclined relative to said axis and a second side extending generally in the direction of said axis, said first and second sides converging to form cutting edges.

7. In combination, a socket wrench and a tool for cutting a nut comprising a socket wrench having an opening of a predetermined peripheral configuration, a tool for cutting a nut comprising a body in the shape of a nut having an axis and an outer peripheral configuration for mating engagement with said opening, and a plurality of cutting blades on said body extending radially on said body and in the general direction of said axis, each of said blades have a first side inclined relative to said axis and a second side extending generally in the direction of said axis, said first and second sides converging to form cutting edges.

8. The combination as set forth in claim 7 wherein said blades extend outwardly beyond said socket wrench.

9. The combination as set forth in claim 7 wherein said blades are located within said opening.

* * * * *

UNITED STATES PATENT AND TRADEMARK OFFICE
CERTIFICATE OF CORRECTION

PATENT NO. : 4,572,035
DATED : February 25, 1986
INVENTOR(S) : Elroy C. Eisenhauer It is certified that error appears in the above-identified patent and that said Letters Patent are hereby corrected as shown below:

Column 4, line 17, change "aving" to --having--.

line 66 (claim 5), change "substantially perpendicularly" to --transversely--.

Signed and Sealed this

Twenty-seventh Day of May 1986

[SEAL]

Attest:

DONALD J. QUIGG

Attesting Officer

Commissioner of Patents and Trademarks